(12) United States Patent
Xie

(10) Patent No.: US 11,516,450 B1
(45) Date of Patent: Nov. 29, 2022

(54) METHOD OF REGIONAL COLOR PROCESSING BASED ON VIDEO CONTENT AND SYSTEM USING THE SAME

(71) Applicant: Wenjun Xie, Shenzhen (CN)

(72) Inventor: Wenjun Xie, Shenzhen (CN)

( * ) Notice: Subject to any disclaimer, the term of this patent is extended or adjusted under 35 U.S.C. 154(b) by 0 days.

(21) Appl. No.: 17/864,496

(22) Filed: Jul. 14, 2022

(30) Foreign Application Priority Data

Jun. 17, 2022 (CN) .......................... 202210693078.0

(51) Int. Cl.
*H04N 9/64* (2006.01)
*G06T 5/00* (2006.01)
*G06T 5/20* (2006.01)

(52) U.S. Cl.
CPC .......... *H04N 9/646* (2013.01); *G06T 5/002* (2013.01); *G06T 5/20* (2013.01); *G06T 2207/10016* (2013.01); *G06T 2207/10024* (2013.01); *G06T 2207/20021* (2013.01)

(58) Field of Classification Search
CPC .......... H04N 9/646; G06T 5/002; G06T 5/20; G06T 2207/10016; G06T 2207/10024; G06T 2207/20021
See application file for complete search history.

(56) References Cited

U.S. PATENT DOCUMENTS

| | | | |
|---|---|---|---|
| 2012/0070102 A1* | 3/2012 | Yokokawa | H04N 17/002 382/286 |
| 2016/0253789 A1* | 9/2016 | Chen | H04N 5/213 348/241 |
| 2017/0061236 A1* | 3/2017 | Pope | G06V 10/60 |
| 2019/0188835 A1* | 6/2019 | Loginov | G06T 5/008 |
| 2021/0124977 A1* | 4/2021 | Panetta | G06V 10/40 |

* cited by examiner

*Primary Examiner* — Michael Lee
(74) *Attorney, Agent, or Firm* — Li & Cai Intellectual Property (USA) Office

(57) ABSTRACT

A method of regional color processing based on video content and a system using the same are provided, comprising: step 1: dividing a data area; step 2: denoising pixel video data; step 3: generating a representative value of small block; step 4: detecting a video scene type; step 5: smoothing of the representative value of the small block; step 6: dark block fading processing; step 7: HDR custom compensating/definition restoring; and step 8: generating a representative value of the large block. It divides the video source data into small blocks or large blocks according to the rendering granularity of the ambient light, and implements algorithms such as noise reduction, smooth processing and adaptive compensation according to the video format and content, and the lighting rendering can follow the video signal in real time, which can effectively reduce the sudden change of rendering light and bring users more soothing experience.

8 Claims, 1 Drawing Sheet

METHOD OF REGIONAL COLOR PROCESSING BASED ON VIDEO CONTENT AND SYSTEM USING THE SAME

FIELD OF THE DISCLOSURE

The present disclosure relates to the technical field of video processing, in particular, to a method of regional color processing based on video content and a system using the same.

BACKGROUND OF THE DISCLOSURE

With more and more home audio and video equipment, home theater and e-sports have higher and higher requirements for immersive performance, and the products of audio and video rendering lights are also more and more abundant. However, one of the current lighting rendering is a predefined fixed mode loop rendering, which cannot track the video signal in real time, and the experience is not good; the other can detect the color signal in the video signal and output the real-time rendering signal, which can get better results. However, there are several problems in this mode: 1. Since the particle size of the ambient light is much lower than the pixels of the video signal, it is impossible to achieve a one-to-one correspondence between the light and the video pixels. If the processing is not good, the color of the video and the color of the light will be inconsistent. 2. There is obvious flicker or jitter when the video changes rapidly. 3. There are various formats of video sources, and the compatibility of each format (such as HDR, Dolby vision, etc.) is not well handled, and the rendering effect is not good.

SUMMARY OF THE DISCLOSURE

The purpose of the present disclosure is to provide a method and system for regional color processing based on video content, so as to solve the problems of compatibility between the prior art and video source data, and poor experience effects in various video scenarios.

The present disclosure is implemented by the following technical solutions: a method of regional color processing based on video content, comprising:

step 1: dividing a data area, which a video image with a resolution of p×q is divided into m×n small blocks each containing a plurality of pixels, and then the small blocks are divided into j×k large blocks each containing multiple ones of the small blocks; wherein p represents columns, q represents rows, m represents columns, n represents rows, j represents columns, and k represents rows, where p≥m≥j and q≥n≥k;

step 2: denoising pixel video data, which pre-biased video data (Rpre, Gpre, Bpre) is subtracted from video data (Ri, Gi, Bi) of each of the plurality of pixels to achieve undercutting;

step 3: generating a representative value of the small block, which the video data that is denoised of all parts or pixels of interest in each of the small blocks is averaged to obtain a representative value of the small block;

step 4: detecting a video scene type, which a representative value of a current frame of each of the small blocks is compared with a representative value of a previous frame, wherein, if a difference therebetween is large, it is a dynamic block, otherwise it is a static block; if a number of the dynamic blocks in a whole frame is large, it is a dynamic scene, otherwise it is a static scene;

step 5: smoothing of the representative value of the small block, which the smoothing is performed based on the representative value of the small block of the current frame and a historical frame, and different smoothing processing methods or coefficients according to the dynamic scene or the static scene determined in step 4 are used to achieve different response effects;

step 6: dark block fading processing, wherein, if a brightness value corresponding to RGB of a smooth output of the current frame of each of the small blocks is less than a threshold, it is determined as a dark block and a brightness is retained to fade the color;

step 7: HDR custom compensating/definition restoring, wherein, if a video source is HDR, a determined RGB value is transformed to include but not limited to HSV color gamut and H/V is remained unchanged, and an S value is adjusted as needed to achieve an SDR color effect, or HDR color is restored to SDR color effect according to HDR definition; and step 8: generating a representative value of the large block, which according to final output values of all parts in each of the large blocks or the small blocks of the interested part processed in steps 6 and 7, histogram statistics is performed on a distribution of chromaticity values corresponding to RGB in a range of 0° to 360°, Gaussian filtering is performed on the histogram statistics to obtain a central chromaticity with a most dense distribution, and the RGBs of all pixels within a small angle range centered on the central chromaticity are averaged to obtain the representative value of the large block.

Further, the part of interest in step 3 or step 8 includes but is not limited to a central part of the small block.

Further, in step 3 or step 8, the part of interest includes, but is not limited to, a central part of the small block.

Further, in step 2, a saturation subtraction is adopted to carry out the undercutting, and a concrete formula of the undercutting is: Ri'=Ri⊖Rpre, Gi'=Gi⊖Gpre, Bi'=Bi⊖Bpre, wherein Ri, Gi, and Bi correspondingly represent video data of each pixel, Rpre, Gpre and Bpre correspondingly represent the pre-biased video data, and Ri', Gi', and Bi' correspondingly represent the video data of the pixel that is denoised.

Further, in step 3, the video data that is denoised of all parts or pixels of interest in each of the small blocks is averaged to obtain the representative value of the small block includes denoting a number of pixels selected as S, $$R_i^{small} = \left(\sum_{i=1}^{S} Ri'\right)\bigg/S$$

$$G_i^{small} = \left(\sum_{i=1}^{S} Gi'\right)\bigg/S$$

$$B_i^{small} = \left(\sum_{i=1}^{S} Bi'\right)\bigg/S$$

wherein $R_i'$, $G_i'$, $B_i'$ are the video denoising data of pixels, and $R_i^{small}$, $G_i^{small}$, and $B_i^{small}$ are the representative value of the small block.

Further, in step 5, the smoothing includes, but is not limited to, using a moving average filter, a Gaussian filter, a FIR filter, and an IIR filter for smoothing.

Further, in step 6, a specific method of determining the brightness value corresponding to the RGB of the smooth output of the current frame of each of the small blocks being smaller than the threshold is as follows:

$$Y=0.3 \times R_{i(t)}^{small}+0.6 \times G_{i(t)}^{small}+0.1 \times B_{i(t)}^{small}$$

$$R^{i\ fade}=(Y<\text{Thr})?Y:R^{i(t)small}$$

$$G^{i\ fade}=(Y<\text{Thr})?Y:G^{i(t)small}$$

$$B^{i\ fade}=(Y<\text{Thr})?Y:B^{i(t)small}$$

wherein, $R^{i(t)\ small}$, $G^{i(t)\ small}$, $B^{i(t)\ small}$ is the smooth output of the small block i at the current frame (t) time, Thr is the threshold; the three equations correspondingly represent: if the brightness value corresponding to the RGB of the smooth output of the current frame of each of the small blocks is less than the threshold Thr, it is determined as the dark block and the brightness is retained to fade the color.

The present disclosure further provides a system for regional color processing based on video content, comprising:

a data area division module configured to divide a video image with a resolution of p×q into m×n small blocks, wherein each small block contains several pixels; then dividing the small blocks into j×k large blocks, wherein each large block contains several small blocks; wherein p represents columns, q represents rows, m represents columns, n represents rows, j represents columns, and k represents rows, where p≥m≥j and q≥n≥k;

a denoising pixel video data module configured to subtract pre-biased video data (Rpre, Gpre, Bpre) from the video data (Ri, Gi, Bi) of each pixel to achieve undercutting;

a representative value of small block module configured to average the video denoising data of all parts or pixels of interest in each small block to obtain a representative value of a small block;

a video scene type detection module configured to compare the representative value of a current frame of each small block with the representative value of a previous frame, wherein if a difference is large, it is a dynamic block, otherwise it is a static block; if a number of dynamic blocks in a whole frame is large, it is a dynamic scene, otherwise it is a static scene;

a smoothing module of the representative value of the small block configured to perform smoothing based on the representative value of the small block of the current frame and a historical frame, and use different smoothing processing methods or coefficients according to the dynamic scene or the static scene determined to achieve different response effects;

a dark block fading processing module configured to determine the block as a dark block and retain a brightness to fade the color if a brightness value corresponding to the RGB of a smooth output of the current frame of each of the small blocks is less than a threshold;

a HDR custom compensation/definition restoration module configured to convert a determined RGB value to include but not limited to HSV color gamut and remain H/V unchanged if a video source is HDR, and adjust a S value as needed to achieve SDR color effect, or restore HDR color to SDR color effect according to HDR definition; and a representative value of a large block generation module configured to perform histogram statistics on a distribution of chromaticity values corresponding to RGB in a range of 0~360°, and perform Gaussian filtering on the histogram statistics to obtain a central chromaticity with a most dense distribution, and average the RGBs of all pixels within a small angle range centered on the central chromaticity to obtain the representative value of the large block according to final output values of all parts within each large block or small block of the part of interest processed by the dark block fading processing module and the HDR custom compensation/definition restoration module.

Advantages of the present disclosure are as follows.

The present disclosure can divide the video source data into small blocks or large blocks according to the rendering granularity of the ambient light, and implement algorithms such as noise reduction, smooth processing and adaptive compensation according to the video format and content, and the lighting rendering can follow the video signal in real time, which can effectively reduce the sudden change of rendering light and bring users a more soothing experience.

BRIEF DESCRIPTION OF THE DRAWINGS

In order to explain the embodiments of the present disclosure or the technical solutions in the prior art more clearly, the following briefly introduces the accompanying drawings that need to be used in the description of the embodiments or the prior art. Obviously, the drawings in the following description are only are some embodiments of the present disclosure. For those of ordinary skill in the art, other drawings can also be obtained from these drawings without creative efforts.

DETAILED DESCRIPTION OF THE EXEMPLARY EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

Figure 1:
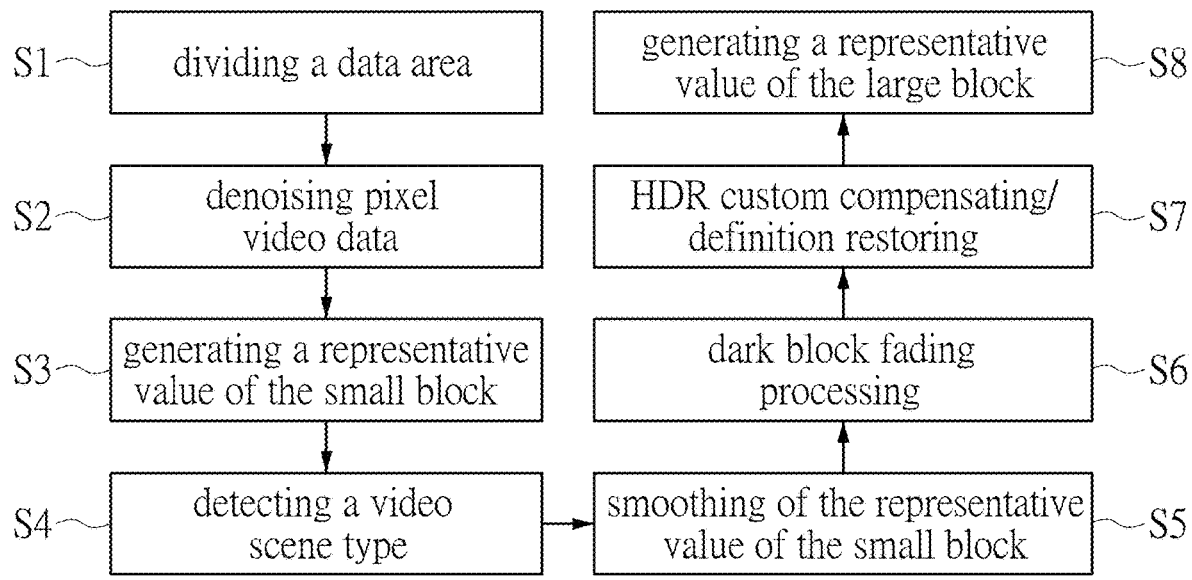
FIG. 1 is a flowchart of a method of processing regional color based on video content according to an embodiment of the present disclosure.
Figure 2:
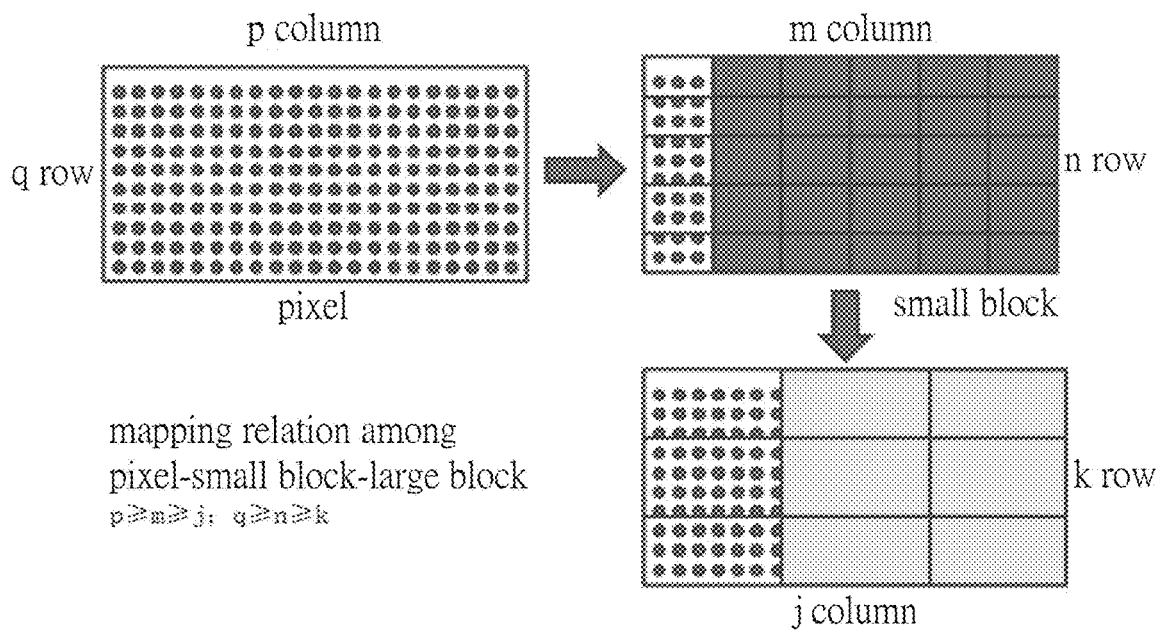
FIG. 2 is a schematic flowchart of data region segmentation of a method of region color processing based on video content according to an embodiment of the present disclosure.

As shown in FIG. 1, a method of regional color processing based on video content includes:

step 1: dividing a data area, which a video image with a resolution of p×q is divided into m×n small blocks each containing a plurality of pixels, and then the small blocks are divided into j×k large blocks each containing multiple ones of the small blocks; wherein p represents columns, q represents rows, m represents columns, n represents rows, j represents columns, and k represents rows, where p≥m≥j and q≥n≥k;

step 2: denoising pixel video data, which pre-biased video data (Rpre, Gpre, Bpre) is subtracted from video data (Ri, Gi, Bi) of each of the plurality of pixels to achieve undercutting. Since RGB are all unsigned values, negative results cannot appear, so "subtract with saturate" is used, denoted as Θ, which is defined as:

$$a \theta b (a>b)?a-b: 0$$

The actual effect and purpose of undercutting is to generate video denoising data for pixels. The specific formula for undercutting is: Ri'=Ri⊖Rpre, Gi'=Gi⊖Gpre, Bi'=Bi⊖Bpre; where Ri, Gi, Bi represent value of each pixel, respectively. Video data, Rpre, Gpre, Bpre represent pre-biased video data, Ri', Gi', Bi' are pixel video denoising data.

step 3: generating a representative value of the small block, which the video data that is denoised of all parts or pixels of interest in each of the small blocks ((including but not limited to the central part of the small block)) is averaged to obtain a representative value of the small block; specifically: a number of pixels selected is denoted as S, $$R_i^{small} = \left(\sum_{i=1}^{S} Ri'\right)/S$$

$$G_i^{small} = \left(\sum_{i=1}^{S} Gi'\right)/S$$

$$B_i^{small} = \left(\sum_{i=1}^{S} Bi'\right)/S$$

wherein $R_i'$, $G_i'$, $B_i'$ are the video denoising data of pixels, and $R_i^{small}$, $G_i^{small}$, and $B_i^{small}$ are the representative value of small block.

step 4: detecting a video scene type, which a representative value of a current frame of each of the small blocks is compared with a representative value of a previous frame, wherein, if a difference therebetween is large, it is a dynamic block, otherwise it is a static block; if a number of the dynamic blocks in a whole frame is large, it is a dynamic scene, otherwise it is a static scene;

step 5: smoothing of the representative value of the small block, which the smoothing is performed based on the representative value of the small block of the current frame and a historical frame, and different smoothing processing methods or coefficients according to the dynamic scene or the static scene determined in step 4 are used to achieve different response effects; wherein the smoothing method includes, but is not limited to, using a moving average filter, a Gaussian filter, a FIR filter, and an IIR filter. Taking the IIR filter as an example, the specific formula is:

| | |
|---|---|
| $R_{i(t)}^{small} = a *$ $R_i^{small} + (1 - a) * R_{i(t-1)}^{small}$ | wherein: $R_{i(t-1)}^{small}$ is the smooth output of the small block i at the time of the previous frame (t − 1); $R_{i(t)}^{small}$ is the smooth output of the small block i at the time of the current frame (t); the coefficients a ∈[0, 1], If a is small, the smoothing effect is strong and the following speed is slow. If a is large, the smoothing effect is weak and the following speed is fast. |
| $G_{i(t)}^{small} = a *$ $G_i^{small} + (1 - a) * G_{i(t-1)}^{small}$ | Same as above |
| $B_{i(t)}^{small} = a *$ $B_i^{small} + (1 - a) * B_{i(t-1)}^{small}$ | Same as above | step 6: dark block fading processing, wherein, if a brightness value corresponding to RGB of a smooth output of the current frame of each of the small blocks is less than a threshold, it is determined as a dark block and a brightness is retained to fade the color; wherein the specific method is:

$$Y=0.3 \times R_{i(t)}^{small}+0.6 \times G_{i(t)}^{small}+0.1 \times B_{i(t)}^{small}$$

$$R^{i\,fade}=(Y<\text{Thr})?Y:R^{i(t)small}$$

$$G^{i\,fade}=(Y<\text{Thr})?Y:G^{i(t)small}$$

$$B^{i\,fade}=(Y<\text{Thr})?Y:B^{i(t)small}$$

wherein, $R_{i(t)}^{small}$, $G_{i(t)}^{small}$, $B_{i(t)}^{small}$ are the smooth output of the small block i at the current frame (t) time, Thr is the threshold; the brightness value corresponding to the RGB of the smooth output of the current frame is less than the threshold Thr, then it is determined as a dark block and the brightness is retained to fade the color.

step 7: HDR custom compensating/definition restoring, wherein, if a video source is HDR, a determined RGB value is transformed to include but not limited to HSV color gamut and H/V is remained unchanged, and an S value is adjusted as needed to achieve an SDR color effect, or HDR color is restored to SDR color effect according to HDR definition; and step 8: generating a representative value of the large block, which according to final output values of all parts in each of the large blocks or the small blocks of the interested part processed in steps 6 and 7, histogram statistics is performed on a distribution of chromaticity values corresponding to RGB in a range of 0° to 360°, Gaussian filtering is performed on the histogram statistics to obtain a central chromaticity with a most dense distribution, and the RGBs of all pixels within a small angle range centered on the central chromaticity are averaged to obtain the representative value of the large block.

The present disclosure further provides a system for regional color processing based on video content, comprising:

a data area division module configured to divide a video image with a resolution of p×q into m×n small blocks, wherein each small block contains several pixels; then dividing the small blocks into j×k large blocks, wherein each large block contains several small blocks; wherein p represents columns, q represents rows, m represents columns, n represents rows, j represents columns, and k represents rows, where p≥m≥j and q≥n≥k;

a denoising pixel video data module configured to subtract pre-biased video data (Rpre, Gpre, Bpre) from the video data (Ri, Gi, Bi) of each pixel to achieve undercutting;

a representative value of small block module configured to average the video denoising data of all parts or pixels of interest in each small block to obtain a representative value of a small block;

a video scene type detection module configured to compare the representative value of a current frame of each small block with the representative value of a previous frame, wherein if a difference is large, it is a dynamic block, otherwise it is a static block; if a number of dynamic blocks in a whole frame is large, it is a dynamic scene, otherwise it is a static scene;

a smoothing module of the representative value of the small block configured to perform smoothing based on the representative value of the small block of the current frame and a historical frame, and use different smoothing processing methods or coefficients according to the dynamic scene or the static scene determined to achieve different response effects;

a dark block fading processing module configured to determine the block as a dark block and retain a brightness to fade the color if a brightness value corresponding to the RGB of a smooth output of the current frame of each of the small blocks is less than a threshold;

a HDR custom compensation/definition restoration module configured to convert a determined RGB value to include but not limited to HSV color gamut and remain H/V unchanged if a video source is HDR, and adjust a S value as needed to achieve SDR color effect, or restore HDR color to SDR color effect according to HDR definition; and a representative value of a large block generation module configured to perform histogram statistics on a distribution of chromaticity values corresponding to RGB in a range of 0~360°, and perform Gaussian filtering on the histogram statistics to obtain a central chromaticity with a most dense distribution, and average the RGBs of all pixels within a small angle range centered on the central chromaticity to obtain the representative value of the large block according to final output values of all parts within each large block or small block of the part of interest processed by the dark block fading processing module and the HDR custom compensation/definition restoration module.

The above descriptions are only preferred embodiments of the present disclosure, and are not intended to limit the present disclosure. Any modification, equivalent replacement, improvement, etc. made within the spirit and principle of the present disclosure shall be included within the protection scope of the present disclosure.

What is claimed is:

1. A method of regional color processing based on video content, comprising the following steps:
   step 1: dividing a data area, which a video image with a resolution of p×q is divided into m×n small blocks each containing a plurality of pixels, and then the small blocks are divided into j×k large blocks each containing multiple ones of the small blocks; wherein p represents columns q represents rows, m represents columns, n represents rows, j represents columns, and k represents rows, where p≥m≥j and q≥n≥k;
   step 2: denoising pixel video data, which pre-biased video data (Rpre, Gpre, Bpre) is subtracted from video data (Ri, Gi, Bi) of each of the plurality of pixels to achieve undercutting;
   step 3: generating a representative value of the small block, which the video data that is denoised of all parts or pixels of interest in each of the small blocks is averaged to obtain a representative value of the small block;
   step 4: detecting a video scene type, which a representative value of a current frame of each of the small blocks is compared with a representative value of a previous frame, wherein, if a difference therebetween is large, it is a dynamic block, otherwise it is a static block; if a number of the dynamic blocks in a whole frame is large, it is a dynamic scene, otherwise it is a static scene;
   step 5: smoothing of the representative value of the small block, which the smoothing is performed based on the representative value of the small block of the current frame and a historical frame, and different smoothing processing methods or coefficients according to the dynamic scene or the static scene determined in step 4 are used to achieve different response effects;
   step 6: dark block fading processing, wherein, if a brightness value corresponding to RGB of a smooth output of the current frame of each of the small blocks is less than a threshold, it is determined as a dark block and a brightness is retained to fade the color;
   step 7: HDR custom compensating/definition restoring, wherein, if a video source is HDR, a determined RGB value is transformed to include but not limited to HSV color gamut and H/V is remained unchanged, and an S value is adjusted as needed to achieve an SDR color effect, or HDR color is restored to SDR color effect according to HDR definition; and
   step 8: generating a representative value of the large block, which according to final output values of all parts in each of the large blocks or the small blocks of the interested part processed in steps 6 and 7, histogram statistics is performed on a distribution of chromaticity values corresponding to RGB in a range of 0° to 360°, Gaussian filtering is performed on the histogram statistics to obtain a central chromaticity with a most dense distribution, and the RGBs of all pixels within a small angle range centered on the central chromaticity are averaged to obtain the representative value of the large block.

2. The method according to claim 1, wherein in step 3 or step 8, the part of interest includes, but is not limited to, a central part of the small block.

3. The method according to claim 1, wherein in step 8, the RGBs of all pixel points within a range of 60° angle centered on the central chromaticity are averaged to obtain the representative value of the large block.

4. The method according to claim 1, wherein in step 2, a saturation subtraction is adopted to carry out the undercutting, and a concrete formula of the undercutting is: Ri'=Ri⊖Rpre, Gi'=Gi⊖Gpre, Bi'=Bi⊖Bpre, wherein Ri, Gi, and Bi correspondingly represent video data of each pixel, Rpre, Gpre and Bpre correspondingly represent the pre-biased video data, and Ri', Gi', and Bi' correspondingly represent the video data of the pixel that is denoised.

5. The method according to claim 1, wherein in step 3, the video data that is denoised of all parts or pixels of interest in each of the small blocks is averaged to obtain the representative value of the small block includes denoting a number of pixels selected as S, $$R_i^{small} = \left(\sum_{i=1}^{S} Ri'\right)/S$$

$$G_i^{small} = \left(\sum_{i=1}^{S} Gi'\right)/S$$

$$B_i^{small} = \left(\sum_{i=1}^{S} Bi'\right)/S$$

wherein Ri, Gi, Bi are the video data of the pixels that are denoised, and $R_i^{small}$, $G_i^{small}$, and $B_i^{small}$ are the representative values of the small block.

6. The method according to claim 1, wherein in step 5, the smoothing includes, but is not limited to, using a moving average filter, a Gaussian filter, a FIR filter, and an IIR filter for smoothing.

7. The method according to claim 1, wherein in step 6, a specific method of determining the brightness value corresponding to the RGB of the smooth output of the current frame of each of the small blocks being smaller than the threshold is as follows:

$$Y = 0.3 \times R_{i(t)}^{small} + 0.6 \times G_{i(t)}^{small} + 0.1 \times B_{i(t)}^{small}$$

$$R^{i\ fade} = (Y < Thr)?Y:R^{i(t)small}$$

$$G^{i\ fade} = (Y < Thr)?Y:G^{i(t)small}$$

$$B^{i\ fade} = (Y < Thr)?Y:B^{i(t)small}$$

wherein, $R^{i(t)\ small}$, $G^{i(t)\ small}$, $B^{i(t)\ small}$ is the smooth output of the small block i at the current frame (t) time, Thr is the threshold; the three equations correspondingly represent: if the brightness value corresponding to the RGB of the smooth output of the current frame of each of the small blocks is less than the threshold Thr, it is determined as the dark block and the brightness is retained to fade the color.

8. A system for regional color processing based on video content, comprising:

a data area division module configured to divide a video image with a resolution of p×q into m×n small blocks, wherein each small block contains several pixels; then dividing the small blocks into j×k large blocks, wherein each large block contains several small blocks; wherein p represents columns, q represents rows, m represents columns, n represents rows, j represents columns, and k represents rows, where $p \geq m \geq j$ and $q \geq n \geq k$;

a denoising pixel video data module configured to subtract pre-biased video data (Rpre, Gpre, Bpre) from the video data (Ri, Gi, Bi) of each pixel to achieve undercutting;

a representative value of small block module configured to average the video denoising data of all parts or pixels of interest in each small block to obtain a representative value of a small block;

a video scene type detection module configured to compare the representative value of a current frame of each small block with the representative value of a previous frame, wherein if a difference is large, it is a dynamic block, otherwise it is a static block; if a number of dynamic blocks in a whole frame is large, it is a dynamic scene, otherwise it is a static scene;

a smoothing module of the representative value of the small block configured to perform smoothing based on the representative value of the small block of the current frame and a historical frame, and use different smoothing processing methods or coefficients according to the dynamic scene or the static scene determined to achieve different response effects;

a dark block fading processing module configured to determine the block as a dark block and retain a brightness to fade the color if a brightness value corresponding to the RGB of a smooth output of the current frame of each of the small blocks is less than a threshold;

a HDR custom compensation/definition restoration module configured to convert a determined RGB value to include but not limited to HSV color gamut and remain H/V unchanged if a video source is HDR, and adjust a S value as needed to achieve SDR color effect, or restore HDR color to SDR color effect according to HDR definition; and a representative value of a large block generation module configured to perform histogram statistics on a distribution of chromaticity values corresponding to RGB in a range of 0~360°, and perform Gaussian filtering on the histogram statistics to obtain a central chromaticity with a most dense distribution, and average the RGBs of all pixels within a small angle range centered on the central chromaticity to obtain the representative value of the large block according to final output values of all parts within each large block or small block of the part of interest processed by the dark block fading processing module and the HDR custom compensation/definition restoration module.

* * * * *